Patented Oct. 14, 1952

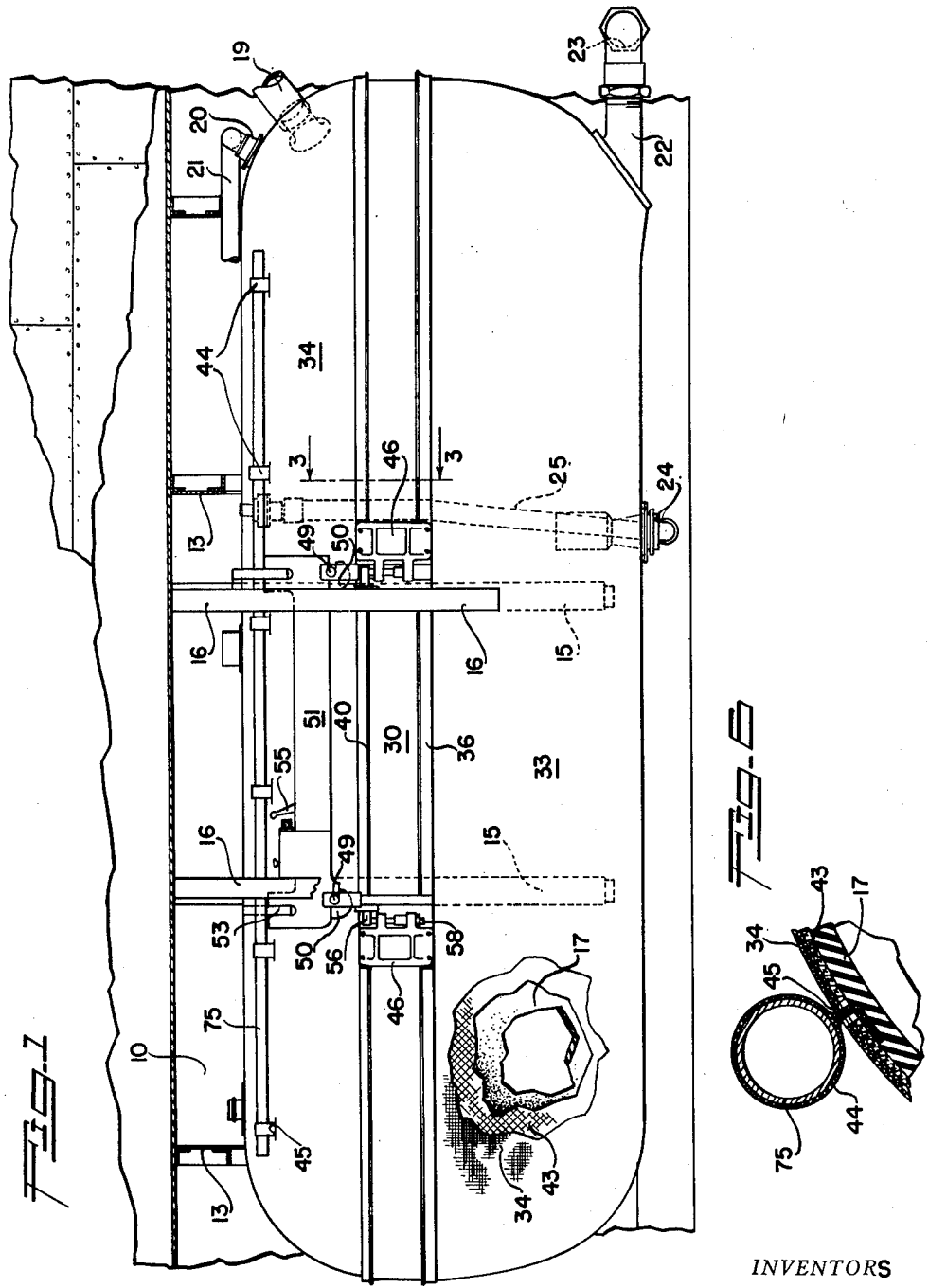

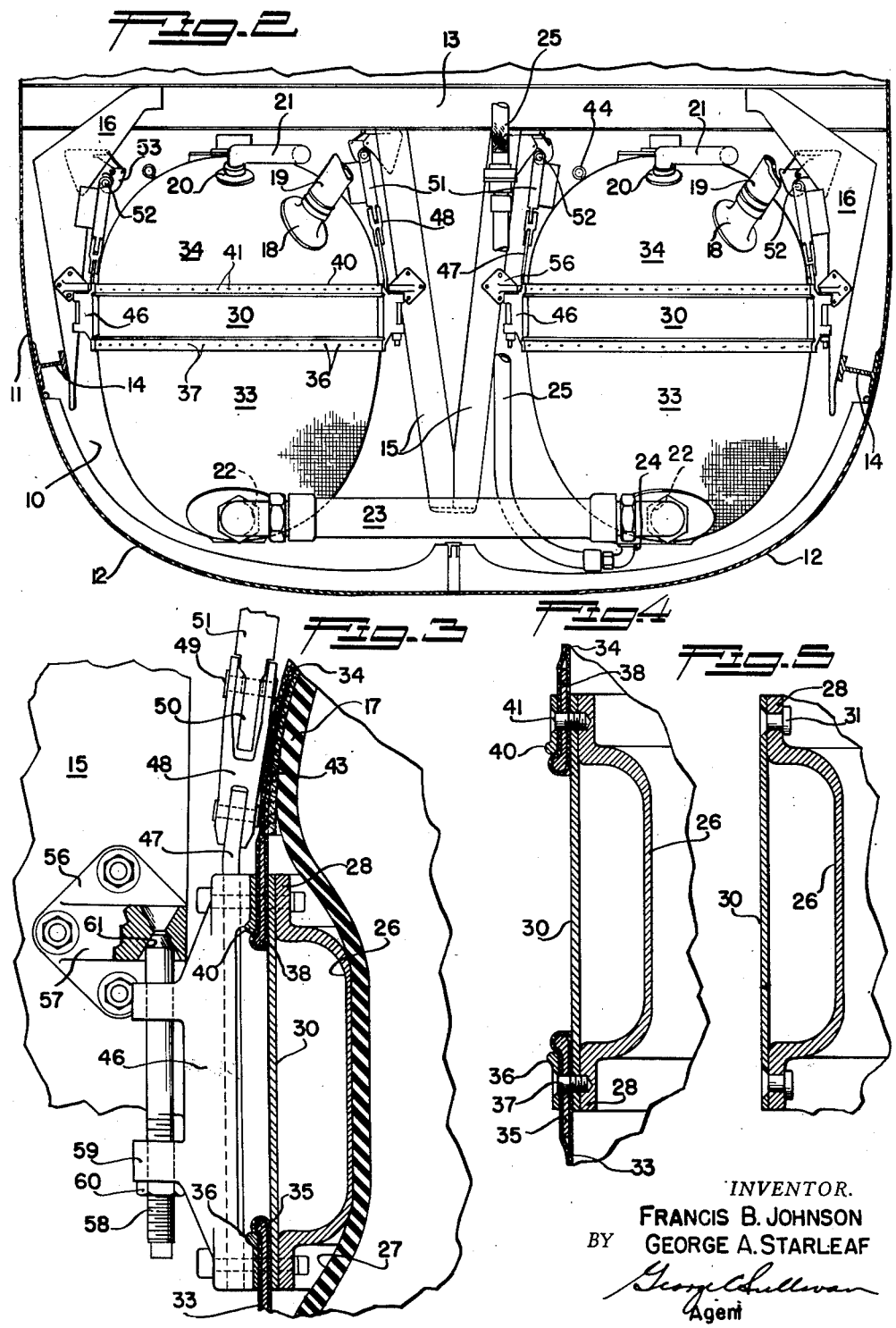

2,613,715

UNITED STATES PATENT OFFICE 2,613,715

AIRCRAFT TANK ASSEMBLY AND SUPPORTING MEANS FOR THE SAME

Francis B. Johnson and George A. Starleaf, Burbank, Calif., assignors to Lockheed Aircraft Corporation, Burbank, Calif.

Application August 24, 1949, Serial No. 112,038

6 Claims. (Cl. 150—0.5)

This invention relates to fluid containers or tanks and relates more particularly to tanks for incorporation in aircraft and adapted to contain fuel, oil, etc.

While the present invention is not confined to any given field of use, it has one particular application to tanks for aircraft. In airplanes, and especially in military craft, it is often desirable or necessary to employ supplemental fuel tanks to increase the aggregate fuel capacity and, therefore, increase the range of flight of the airplane. In the case of military airplanes, such additional tanks are oftentimes installed in the bomb-bay and are usually arranged in such a way that they may be installed and removed when the airplane is on the ground, and jettisoned during flight if the latter course becomes necessary. The tanks are pliant and flexible, being primarily rubber or rubber-like structures and, in the past, it has been found necessary to install bulkheads, or the like, to support the tanks against fore and aft loads and other load conditions encountered during flight. For example, it has been the practice to form such tanks with flat, substantially vertical fore and aft ends, and to install special bulkheads in the bomb-bay to support these walls of the tanks. These expediencies, of course, increase the weight of the installation and add to its complexity.

It is a general object of the present invention to provide a tank and tank installation of the character above-mentioned, that is simple and relatively inexpensive, and that requires a minimum of special equipment and structure in the bomb-bay or other compartment in which it is to be installed.

Another object of the invention is to provide a tank and tank supporting means which does not require bulkheads, or the like, for assuming fore and aft loads, etc.

Another object of the invention is to provide tanks of the class referred to of special configuration and suspension or supporting means of fabric, or the like, tailored or shaped to conform with the tanks so as to brace and support the same against fore and aft loads as well as vertical and lateral loads, thereby rendering special bulkheads, or the like, unnecessary.

A further object of the invention is to provide a tank installation of this kind incorporating a beam which encircles the tank and which carries the fabric hammock or tank supporting means, the beam constituting a continuous substantially rigid torque-tube element adapted to be conveniently secured in the aircraft for the transference of the tank loads to the airplane structure. The beam encircles the tank in a plane between its upper and lower sides and the fabric tank supports are anchored along their edges to the beam so that the weight of the tank and its contents and the forces imposed on the tank are transferred directly to the beam which, in turn, may be readily secured in the bomb-bay by bomb shackles, strap assemblies, and hook devices so as to permit jettisoning of the tanks if necessary.

Other objects and features of the invention will be readily understood from the following detailed description of a typical preferred form of the invention wherein reference will be made to the accompanying drawings, in which:

Figure 1 is a side elevation of a tank of the invention installed in a bomb-bay, illustrating a portion of the airplane in vertical cross section;

Figure 2 is an end elevation of a pair of the tanks as installed in the bomb-bay with the bomb-bay walls appearing in vertical cross section;

Figure 3 is an enlarged fragmentary vertical detailed sectional view taken substantially as indicated by line 3—3 on Figure 1;

Figure 4 is an enlarged vertical sectional view of the beam of one of the tanks illustrating the fabric tank supporting means secured thereto;

Figure 5 is an enlarged vertical sectional view of the beam assembly per se; and Figure 6 is an enlarged fragmentary vertical sectional view taken substantially as indicated by line 6—6 on Figure 1.

In the drawings we have shown the invention incorporated in a tank installation in the bomb-bay of an airplane, it being understood that this is only one specific illustrative form and application of the invention. The bomb-bay 10 has side walls 11 and is provided at its lower end with two hinged closures or doors 12 which may be opened at will. The airframe structure includes spaced horizontal members 13 extending across the upper end of the bomb-bay 10 and fore and aft members 14 at the bomb-bay walls 11. Two spaced pairs of downwardly convergent rack-parts 15 are secured to the members 13 and extend downwardly in the bomb-bay 10 to have their lower ends joined adjacent the center line of the airplane. Spaced side racks 16 are secured to the members 13 and 14 at each side of the bomb-bay 10.

In Figure 2, there is shown two tanks of the invention mounted in the bomb-bay 10. The tanks are elongate hollow units each comprising a body 17 of rubber, rubber composition, synthetic rubber, or combinations of such materials and fabric, and the like, and, where desired, the walls of the tank bodies 17 may be of bullet sealing construction. However, the present invention is not primarily concerned with the exact composition or character of the tank walls, it being sufficient to state that the tank bodies 17 are constructed of pliable or flexible material. The tank bodies 17 are substantially ovate in vertical cross section or end view, as clearly illustrated in Figure 2, and it is a feature of the invention that the opposite ends of the elongate tanks are convex or spheroidal, as best shown in Figure 1. This configuration of the tanks is important as it lends itself to adequate support by the fabric tank hammocks or supporting means to be subsequently described. As will be more fully described below, a beam 26 encircles each tank body 17 some distance above the central horizontal plane of the tank body. The configuration of the tank bodies 17 below these beams 26 is important. Each tank body 17 has a transverse cross sectional contour below the line of the beam 26 which would be the contour assumed by a flexible diaphragm under a hydraulic head equal to the hydraulic head existing in one of the tanks substantially filled with fuel, or the like. This contour, which is determined either mathematically or experimentally, has a downward and inward curvature which increases with the increasing hydraulic head. The contour of the substantially spheroidal ends of the tank bodies 17 below the beams 26 is obtained or created by rotating the above described transverse or side surface about its central vertical axis, so that the curvature of the ends of a tank body 17 in any given vertical plane is the same, or substantially the same, as the curvature of a side of the body in any given plane. With this configuration, all internal pressure forces are balanced by the curvature assumed by the tank wall so that the tank wall elements carry only tension loads. The contour of the tank bodies above the beam 26 may be arbitrarily selected. However, in the preferred arrangement illustrated, the upper portions of the tank bodies resemble the lower parts.

The tank bodies 17 are equipped with the usual filling fittings 18 and hoses 19 therefor, and with the gas vents 20 having vent lines 21. Fittings 22, at the lower ends of the tank bodies 17, communicate with a manifold pipe 23 and a booster pump 24 is provided at one fitting 22 to pump the fuel or other contents of the tank through a line 25 to the engine or to other tanks in the airplane. The filling tubes 19, vents 20, and pipe 25 have slip connections or joints which automatically disconnect when the tanks are jettisoned.

The above-mentioned beams 26 encircle the tank bodies 17, there being a beam 26 arranged around each body 17 adjacent to or in the plane of the largest cross sectional dimension of the body. The beams 26 are channel shaped members of aluminum alloy, steel, or the like, arranged with their open sides facing outwardly as shown in Figure 3. The tank bodies 17 are either preformed to have a groove 27 for receiving the beams 26, or the tank bodies may merely be bent or distorted by the beams. In any event, the upper and lower edge flanges 28 of the beams 26 are substantially flush with the external surfaces of the bodies 17. Plates 30 are secured to the flanges 28 by rivets 31, or the like, to extend across the open sides of the channel shaped beams 26, it being understood that the beams and plates extend completely around the tank body 17. In practice, the beams 26 and plates 30 may each be single continuous members joined at their ends or they may be made up of sections appropriately rigidly connected. The beams 26 preferably conform rather accurately with the ovate tank bodies 17. The beams 26, with their plates 30, constitute "torque tubes" which effectively resist the forces that may be created by eccentric or unequal loading of the shackles or other means employed to suspend the tanks.

As above pointed out, the tanks or tank bodies 17 are carried by supporting hammocks or cradles 33 and 34. The cradles 33 extend downwardly from the beams 26 to enclose the lower portions of the tank bodies 17 while the cradles 34 extend upwardly from the beams to enclose the upper parts of the tank bodies. The invention contemplates the fabrication of the hammocks or cradles 33 and 34 of any selected or suitable material. In the present disclosure it will be assumed that the cradles 33 and 34 are fabricated from an appropriate fabric such as a good grade heavy nylon cloth. This fabric may be impregnated with a synthetic rubber composition or the like. The cradles 33 are cut, shaped and tailored to accurately conform to the sides, bottoms, and opposite ends of the tank bodies 17 to completely enclose the bodies below the beams 26. Thus the cradles 33 are adapted to adequately support the entire major lower portions of the tank bodies. The upper edges of the cradles 33 are folded or turned back over metal strips 35 which preferably have bulbs extending along their upper edges. Outer strips 36, of metal, are also provided with bulbs at their opposite edges and are arranged against the folded down portions of the fabric. Spaced screws or bolts 37 secure the strips 35 and 36 to the plates 30 and to the lower flanges 28 of the beams 26 and clamp the fabric of the cradles 33 between the strips 35 and flanges 28 and between the strips 35 and 36, the screws or bolts being rather closely spaced to assure a strong, dependable attachment of the cradles 33 to the beam assemblies.

The cradles 34 are shaped and tailored to closely conform to the sides, tops, and opposite ends of the tank bodies 17 above the beams 26 to completely enclose the tank bodies above the beams. The lower edges of the fabric of the cradles 34 are turned back over metal strips 38 and between the strips 38 and outer strips 40, the strips 38 and 40 being substantially the same as strips 35 and 36 respectively, and being secured to the plates 30 and upper beam flanges 28 by spaced bolts or screws 41. Thus the hammocks or cradles 34 are secured along the beam and plate assemblies 26—30 in the same manner as the cradles 33.

It is to be particularly noted that the cradles 33 and 34, conforming to the spheroidal ends of the tank bodies 17, adequately support the opposite ends of the bodies. This avoids the necessity for bulkheads, or the like, in the bomb-bay 10 for assuming axial or endwise loads. The hammocks or cradles 33 and 34 also conform to the bottom, top and side surfaces of the tank bodies 17 so as to effectively assume vertical and lateral loads and forces during flight and maneuvering of the airplane. It is to be observed that the cradles 33 and 34 are in turn anchored to the beams 26 which form convenient means for handling and supporting the tanks.

It may be found necessary or desirable to provide layers or sheets 43 of fibre-glass fabric, or the like, in the cradles 33 and 34. The sheets 43 are arranged between the external surfaces of the tank bodies 17 and the internal surfaces of the fabric cradles 33 and 34 and serve to reinforce the cradles, being particularly desirable where the tank bodies 17 are of the bullet-sealing type. Where the tanks are of substantial size, it may be desirable to provide means for preventing the upper walls of the tank bodies 17 from sagging when the tanks are empty or partially empty. This means may comprise spaced aligned loops 44 secured to the upper portions of the bodies 17 and passing through openings 45 in the sheets 43 and cradles 34. The loops 44 may be fabric impregnated with rubber or synthetic rubber and are suitably vulcanized to the tank bodies 17. Rods or tubes 75 of aluminum alloy, or the like, pass through the aligned loops 44 to stiffen the tank assemblies and to prevent their upper walls from sagging.

The above described tank assemblies may be suspended or secured in the bomb-bay 10 in any selected or preferred manner. In the drawings we have shown an effective means for securing the tanks which permits them to be jettisoned when required. This means includes two spaced brackets 46 secured to the beam assembly 26—30 at each side of each tank. The brackets 46 have upwardly projecting rods 47 carrying clevices 48. The clevices 48, in turn, have pins 49 which are engaged by the hooks 50 of bomb-shackles 51. Pins 52 on the bomb-shackles are secured and held by latching hooks 53 on the rack parts 15 and 16 described above. The bomb-shackles 51, which are of the class employed to suspend aerial bombs in the bomber-type airplanes, have release levers 55 for disengaging the shackles from the pins 49 to free the tanks for jettisoning, the invention not being concerned with the details of the bomb-shackles which are widely used in military aircraft.

It is preferred to provide means for stabilizing the tank assemblies in the bomb-bay 10 and for transmitting upward forces from the tank assemblies to the airplane structure. Flanged pads or brackets 56 are secured to the rack parts 15 and 16 adjacent the brackets 46. The flanges 57 of the brackets 56 have substantially vertically downwardly flared conical openings 61. Screws 58 pass through openings in lugs 59 on the brackets 46 and each screw is threaded in at least one lug. The upper ends of the screws 58 are conical to fit the openings 61 and the screws may be locked in position by lock-nuts 60. It will be seen that the screws 58, cooperating with the openings 61, serve to stabilize the tanks, eliminating side sway, etc. and are adapted to assist in assuming vertical forces.

From the foregoing it will be apparent that we have provided improved tank assemblies embodying hammocks or cradles 33 and 34 for conforming with the ovate-spheroidal tank bodies of flexible or pliable material so that the tanks and their contents may be carried by the cradles. This avoids the use of metal bulkheads for assisting in supporting and sustaining the tanks. The beam assemblies 26—30, to which the cradles 33 and 34 are attached, are most advantageously located on the tank assemblies and constitute practical convenient means or parts for anchoring or securing the tanks in the aircraft. The beam assemblies 26—30 completely encircle their respective tank bodies 17 to dependably anchor the cradles 33 and 34 which are tailored to the contours of the tank bodies 17.

Having described only a typical form of the invention, we do not wish to be limited to the specific details herein set forth, but wish to reserve to ourselves any variations or modifications that may appear to those skilled in the art and fall within the scope of the following claims.

We claim:

1. Means for supporting an elongate horizontally disposed tank of generally ovate cross section having substantially spheroidal ends, the tank being formed of pliable material, said means comprising a rigid member extending around the tank in a horizontal plane, and a fabric cradle attached to said member and depending therefrom, the cradle engaging about and conforming with the sides and ends of the tank to support the same from the member.

2. Means for supporting a tank of generally ovate cross section elongated in the horizontal direction and having spheroidal ends, the tank being formed of pliable material, said means comprising a beam encircling the tank in a substantially horizontal plane spaced between the upper and lower extremities of the tank, a cradle of fabric secured to the beam and extending around and conforming to the sides and ends of the tank to support the same from the beam, and means for supporting the beam.

3. Means for supporting a tank of generally ovate cross section having spheroidal ends, the tank being formed of pliable material, said means comprising a beam encircling the tank in a substantially horizontal plane between its upper and lower extremities, fabric cradles secured to the beam and enclosing the tank, the cradles conforming to the sides, ends, top and bottom surfaces of the tank to support the tank from the beam, and means for carrying the beam.

4. Means for supporting a tank of generally ovate cross section having substantially spheroidal ends, the tank being formed of pliable material, said means comprising a beam encircling the tank in a substantially horizontal plane spaced between its upper and lower extremities, fabric cradles secured to the beam and extending upwardly and downwardly therefrom to encircle the tank, the cradles conforming to the sides, ends, top and bottom surfaces of the tank to support the tank from the beam, and means for carrying the beam including suspension supports for the beam, and means for holding the beam against upward movement.

5. Means for supporting a tank constructed of flexible material and having spheroidal ends comprising a rigid beam extending around the tank in a generally horizontal plane between the top and bottom of the tank, a fabric cradle secured to the beam and extending around and conforming to the sides, bottom and said ends of the tank to support the same from the beam, means connected with the beam and extending upwardly therefrom to carry the tank and beam, fixed parts adjacent the beam having downwardly facing openings, and pins on the beam cooperating with said openings to stabilize the tank and to assist in holding the tank against upward movement.

6. In combination, a tank formed of flexible material, the tank having side walls which curve downwardly and inwardly from a given horizontal plane spaced between its upper and lower extremities, the curvature gradually becoming more abrupt in the downward direction, and the tank having end walls which curve downwardly and inwardly from said plane at the same curvature as the side walls, the curvature of said sides and ends being related to the hydraulic head imposed by the liquid contents of the tank so that all portions of the sides and ends are under tension in carrying the contents, a horizontal support member encircling the tank at said plane, and hammocks extending upwardly and downwardly from the support member and conforming with said sides and ends to support the tank from said member.

FRANCIS B. JOHNSON.
GEORGE A. STARLEAF.

REFERENCES CITED

The following references are of record in the file of this patent:

UNITED STATES PATENTS

| Number | Name | Date |
|---|---|---|
| 1,514,410 | Verville | Nov. 4, 1924 |
| 2,191,239 | Rethel et al. | Feb. 20, 1940 |
| 2,257,941 | Ellis | Oct. 7, 1941 |
| 2,362,297 | Newell | Nov. 7, 1944 |
| 2,381,400 | Stavely et al. | Aug. 7, 1945 |
| 2,400,248 | Morgan | May 14, 1946 |

FOREIGN PATENTS

| Number | Country | Date |
|---|---|---|
| 120,088 | Great Britain | Oct. 25, 1917 |
| 460,981 | Germany | June 9, 1928 |
| 297,558 | Italy | June 15, 1932 |